US006203850B1

(12) United States Patent
Nomura

(10) Patent No.: US 6,203,850 B1
(45) Date of Patent: Mar. 20, 2001

(54) PLASMA-ANNEALED POROUS POLYMERS

(75) Inventor: Hiroshi Nomura, Shorewood, MN (US)

(73) Assignee: NeoMecs Incorporated, Eden Prairie, MN (US)

( * ) Notice: Subject to any disclaimer, the term of this patent is extended or adjusted under 35 U.S.C. 154(b) by 0 days.

(21) Appl. No.: 09/314,269

(22) Filed: May 18, 1999

(51) Int. Cl.[7] ....................................................... C08J 9/36
(52) U.S. Cl. .............................................. 427/245; 521/53
(58) Field of Search ............................................. 427/245

(56) References Cited

U.S. PATENT DOCUMENTS

| | | |
|---|---|---|
| 4,784,769 | 11/1988 | Giordano et al. . |
| 5,789,461 | 8/1998 | Nicolson et al. . |
| 5,843,789 | 12/1998 | Nomura et al. . |

OTHER PUBLICATIONS

Yasuda, Plasma Polymerization, Academic Press, NY, 1985, pp. 345–354.

Nystrom, "Modification of polysulfone ultrafiltration membranes with UV irradiation . . . ", J. Mem. Sci., 60 (1991), 275–296.

Ding, "Low–protein–adsorption biomaterials from polymer blends," Medical Plastics and Biomaterials, Jul./Aug. 1996, 42–45.

Ulbricht, "Surface modification of ulfiltration membranes by low temperature Plasma I.", J. Applied Poly. Sci., 56 (1995), 325–343.

Ulbricht, "Surface modification of ulfiltration membranes by low temperature plasma II.," J. Mem. Sci., 111 (1996), 193–215.

*Primary Examiner*—Terressa M. Boykin
(74) *Attorney, Agent, or Firm*—Robert J. Petersen

(57) ABSTRACT

Porous polymeric materials are hardened by a process of plasma-annealing, involving treatment of at least one surface with a gas plasma formed by glow discharge through a gas containing a saturated alkane or an acetylene. Plasma-annealed porous polymers with reduced adsorption toward proteins were obtained by exposure to a glow discharge through a gas mixture containing an alkane such as methane in combination with oxygen, air, or a hydrophilic unsaturated organic monomer. For example, porous polysulfone sheet and hollow fiber were plasma-annealed by treatment with a gas plasma containing methane and air or acrylic acid with simultaneous deposition of a hydrophilic polymerizate thereon.

18 Claims, 2 Drawing Sheets

PLASMA-ANNEALED POROUS POLYMERS

TECHNICAL FIELD

This invention relates to porous materials such as filtration membranes. More specifically, this invention relates to porous materials having improved performance through plasma annealing concomitant with reduced surface affinity for protein adsorption, and to methods for generating plasma-annealed materials via treatment by gas plasmas.

BACKGROUND ART

Porous materials have been increasingly applied to processing of solutions containing biological matter. These processes may involve filtration, clarification, fractionation, pervaporation, reverse osmosis, dialysis, affinity separation, blood oxygenation, or similarly related procedures. A common occurrence in such processes is loss of process efficiency due to fouling of material surfaces by biological matter, and most particularly by proteinaceous matter. Such fouling robs these processes of their efficiency and cost effectiveness, entailing process downtime for cleaning and early replacement of irretrievably fouled portions of porous material components.

Proteinaceous biomolecules are highly complex, containing both hydrophilic and hydrophobic regions. These biomolecules are highly conformable and adaptable toward adsorption to surfaces having hydrophobic moieties thereat. They are inherently surface-active and readily bind to material surfaces at the surface-liquid interface. The problem of uncontrolled adsorption of proteinaceous matter extends through a myriad of processes and applications involving contact or processing of proteinaceous solutions and suspensions.

Ultrafiltration of whey through microporous polysulfone membranes provides a particularly prominent example of this problem. Ulfiltration membranes typically show extremely high throughputs of water when tested on pure water as a process feedstream. Contact with a whey as a process feedstream almost always results in an prompt and drastic decline in flux through the same membrane. Adsorption of proteinaceous matter, particularly beta-lactoglobulin and alpha-lactalbumin, has been identified as a primary contributing cause for such drastic flux declines.

Other examples of deleterious effects of protein adsorption on porous surfaces include: clotting of blood on dialysis and oxygenator membranes and hemolysis of red blood cells on surfaces; loss of costly bioengineered proteins (growth hormones, clotting factors, specialty enzymes, etc.) due to irreversible adsorption onto processing membranes; inability to size-fractionate proteins by filtration due to concomitant adsorption and fouling of filter surfaces by proteinaceous molecules; and high background noise in some types of DNA/polynucleic acid blotting analysis procedures due to generalized adsorption of amino-acid-containing biomolecules including proteins.

It is generally known in the art that hydrophobic materials adsorb protein from aqueous solutions or suspensions. It is also generally known in the art that treatments to increase the hydrophilicity of materials often decrease protein adsorption. As a result, various treatments and approaches have been applied to making porous materials that have hydrophilic surfaces. Included in such approaches are methods employing application of hydrophilic polymer coatings, graft polymerizing hydrophilic monomers onto hydrophobic surfaces, treating hydrophobic surfaces with peroxides to alter surface chemistries, modifying with gas plasmas to alter surface chemistries or deposit hydrophilic plasma polymers, and blending or alloying hydrophilic polymers with hydrophobic polymers in the original preparation of the porous materials. Improvements in resistance to fouling by proteinaceous substances have been achieved in some measure by each of these approaches.

Nevertheless, the problem of protein fouling of porous materials is far from being satisfactorily solved. One of the difficulties inherent in the various approaches is the inconstancy of hydrophilicity as a surface parameter. Yasuda (*Plasma Polymerization*, Academic Press, Orlando, Fla., 1985, pp. 345–354) has explained that, in polymeric materials, so-called hydrophilic surfaces contain both hydrophilic and hydrophobic molecular components, and that rotational motion inherent in most polymeric surfaces allow movement and orientation of these components so as to provide the lowest possible energy state at an interface of the polymer surface with water, air, or proteinaceous solution. Thus, a hydrogel consisting of as high as 90% water content may still exhibit a hydrophobic surface by reason of orientation of hydrophobic moieties (as evidenced by contact angle measurements), and may show significant adsorption characteristics toward proteinaceous compounds in a solution or suspension in contact with the hydrogel. A very tightly crosslinked polymeric structure having hydrophilic groups on its outer surface showed stable hydrophilicity. This was demonstrated by means of a plasma-polymerized poly(methane) layer treated with oxygen to develop surface hydroxyl groups. Such a coating remained hydrophilic over a 200 day period. In U.S. Pat. Nos. 5,760,100 and 5,789,461, this approach has been utilized as an adjunct post-treatment in the manufacture of soft, wearable contact lenses, wherein the ocular contact surface has been treated with a methane-air mixture to provide improved hydrophilicity.

Many other approaches have been, and continue to be, developed and used to confer hydrophilicity to a material surface, including chemical grafting, chemical oxidation or etching, polymer blending or alloying, application of all sorts of polymeric coatings, and treatment with various surfactants.

A difficulty unappreciated heretofore in this field as it relates to polymeric porous materials, such as for example microfiltration and filtration membranes, is the softness of these materials when produced in their porous state. While the source polymer may be a fine example of a rigid thermoplastic engineering resin in its virgin state, processing of the same source polymer into a porous article results in an article whose surface may be easily marred by almost any kind of rubbing or abrasive contact. This softness appears to account for a portion of the hysteresis commonly observed in porous membrane materials in pressurized filtrative and concentrative applications. Previously observed hysteresis effects in filtrations have long been thought to solely reflect probable surface fouling by organic contaminants. Loss of performance in a biomaterial processing application is herein now recognized to be not solely a problem of biofouling, but also to include contribution of the softness of the porous polymeric structure by surface compaction during the pressure effects of the filtration operations. Thus, an optimum solution to the problem of biofouling of porous materials by proteinaceous matter must also take into consideration the softness and compressibility of porous polymeric materials, particularly as it relates to discriminating layers present in porous articles intended for contact and processing of biological solutions and suspensions.

It is an object of this invention therefore to provide porous materials for processing solutions or suspensions of biomaterials, wherein the porous materials have been hardened or annealed. It is also an object of this invention to render such porous materials less adsorptive to biofoulants, particularly proteinaceous matter. It is a further object of this invention to provide improved porous materials having reduced fouling tendencies when exposed to fluids containing proteinaceous matter, wherein such exposure may include such processes as filtration, clarification, fractionation, pervaporation, reverse osmosis, dialysis, affinity separation, blood oxygenation, or similarly related procedures. These and other objects of the invention will become evident to one skilled in the art by means of the description and claims to follow.

SUMMARY OF THE INVENTION

It has now been found that a process hereinafter referred to as "plasma annealing" provides porous materials having a highly beneficial combination of surface hardening and hydrophilicity. Thus, in accordance with the invention to be disclosed herein, treatment of porous polymeric materials by a polymerizing gas plasma under certain conditions provides improved materials having reduced softness and stabilized surface hydrophilicity, which materials exhibit remarkably reduced protein adsorption characteristics and increased process efficiencies when used in processes entailing contact with proteinaceous solutions or suspensions. Such materials in the form of plasma-annealed ulfiltration and microfiltration membranes are particularly effective in processes involving transmembrane pressure differentials, especially in the treatment of protein-containing fluids. Thus, porous materials are plasma-annealed by exposing these materials to a low temperature gas plasma formed by glow discharge through a gaseous medium containing an alkane or an acetylene, alone or in combination with oxygen, air, or selected polymerizable monomers.

In one preferred embodiment of this invention, the porous article is treated with a gas plasma generated in a gaseous mixture containing a saturated hydrocarbon—most preferably methane—and air, wherein the surface of the porous article is hardened by the combined exposure to the gas plasma and the incorporation thereon of an ultrathin veneer of a deposit of a plasma polymerizate containing elements derived from the saturated hydrocarbon, with or without elements derived from oxygen, wherein also this plasma deposit itself is only one or two angstroms to about 20 or 25 angstroms in thickness. Resulting articles retain their porosity. Surprisingly, it has been found that thus-treated porous materials having predetermined pore size ranges characteristically retain those predetermined pore sizes despite the addition of the plasma polymerizate deposit, and in fact tend to have slightly widened pores, whereas normal addition of a coating to a porous material would reduce the dimensions of surface pores (see U.S. Pat. No. 4,806,246). The slightly enlarged pores are believed to be one of the manifestations of the plasma annealing process, and are believed to be due to minor shrinkage and hardening of the soft polymeric matrix in the zone of exposure to the gas plasma, as a consequence of plasma annealing occurring in this treatment process.

In another preferred embodiment of this invention, the plasma annealing is conducted by means of a gas plasma generated in a gaseous mixture containing a saturated hydrocarbon (most preferably methane) and a hydrophilic unsaturated monomer (most preferably acrylic acid), wherein the surface of the porous article is similarly hardened by the incorporation thereon of an ultrathin veneer of a plasma deposit containing elements derived from both the hydrocarbon and the hydrophilic unsaturated monomer, this plasma deposit itself again being only one or two angstroms to perhaps 35 angstroms in thickness.

Articles obtained in accordance with this invention comprise porous substrates having at least one surface thereof annealed with simultaneous deposit of a plasma polymerizate via exposure of the surface to a glow discharge gas plasma containing at least one gaseous alkane monomer (such as methane, ethane, propane) or a gaseous acetylene, the gas plasma gases optionally containing also oxygen, air, or a hydrophilic unsaturated monomer such as acrylic acid, most preferably such plasma-annealing being conducted in a glow discharge through a methane/air mixture, such surface intended for subsequent contact with proteinaceous solutions or suspensions. Porous polymeric membranes are one of the forms of porous polymeric materials or substrates amenable to plasma annealing, and improved thereby.

The improved porous materials, which are the subject of this invention, are useful in the treatment of various proteinaceous fluids, including blood, biological sera, milk, whey, soy protein isolates, enzymes, bioengineered proteins and hormones, and the like.

DESCRIPTION OF THE INVENTION

Figure 1:
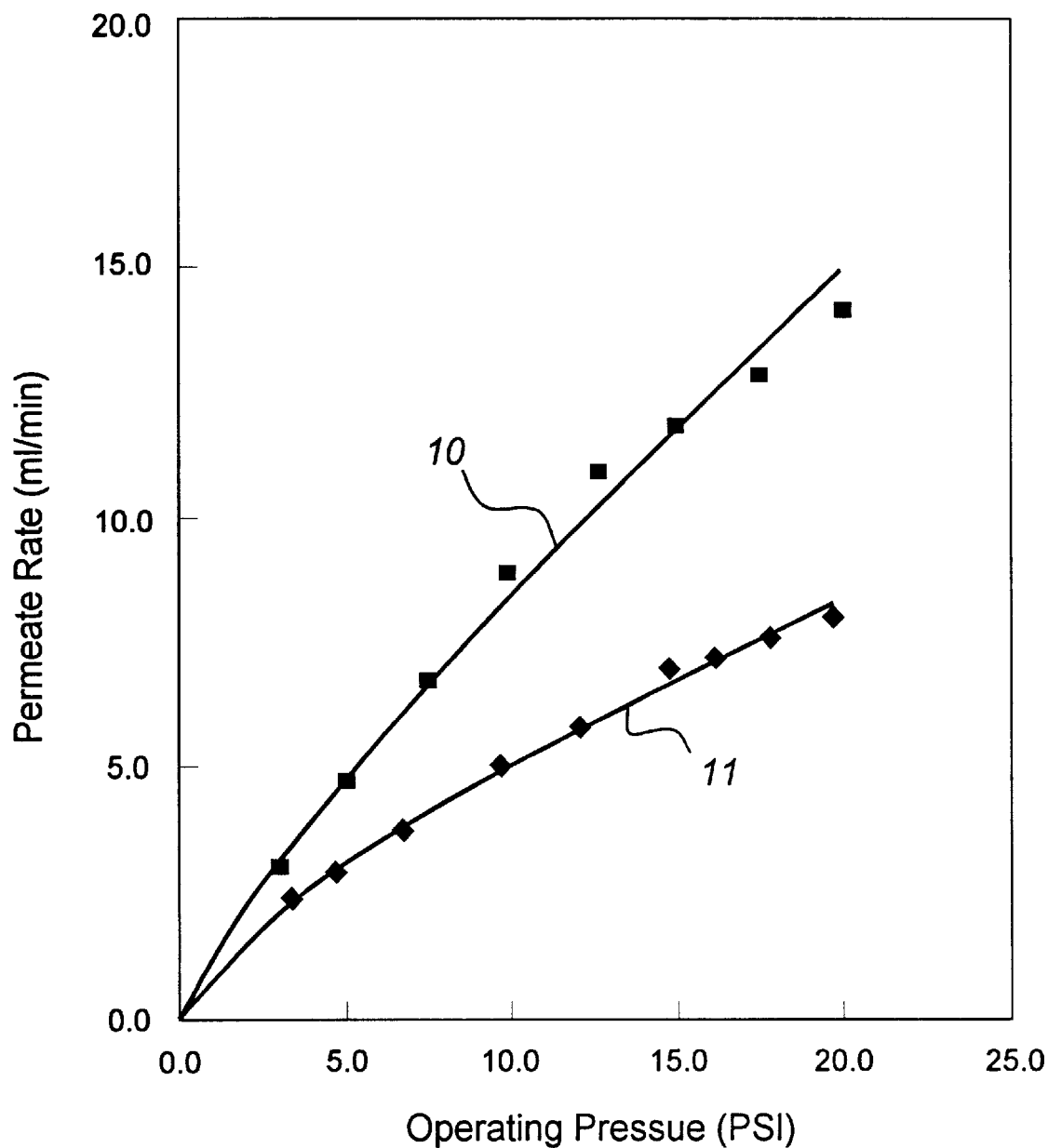
FIG. 1 is a graph of bore flow through polysulfone hollow fibers as a function of externally applied pressure.

In accordance with the invention being disclosed herein, porous materials with annealed surfaces and having greatly reduced affinity for adsorption of proteinaceous substances are prepared by exposing these materials to a glow discharge gas plasma wherein exposed surfaces are simultaneously plasma-annealed and modified by deposition of a plasma polymerizate formed in a gas or gas mixture containing at least one saturated hydrocarbon or an acetylene, preferably in combination with a hydrophilicity-generating co-monomer. By an acetylene is meant a chemical compound having a carbon-carbon triple bond therein.

In a method of making these Unproved materials, a gas or a blend of gases is fed into an evacuated chamber, the gas or blend of gases is excited to a plasma state by a glow discharge maintained by application of energy in the form of an audiofrequency, a microwave frequency or a radiofrequency field, and a suitable substrate is exposed to the glow discharge gas plasma, whereby exposed surfaces of the substrate are modified by deposition of a plasma polymerizate. Apparatus suitable for conducting glow discharge treatments are known to one of ordinary skill in the art. Examples of such apparatus have been previously disclosed in a number of patents including for example U.S. Pat. Nos. 3,068,510, 4,147,745, 5,472,509, and 5,843,789, all of which are herein incorporated by reference. Such apparatus includes equipment suitable for continuous treatment of large batches of porous material such as rolls of sheeting, spools of fiber, belts of mounted articles, or alternate arrays of articles to be treated.

Porous materials to be treated in accordance with this invention are generally to be chosen and fashioned from organopolymeric plastics. Porosity may vary from as little as 10% to as high as 90%, defined in terms of the density of the porous materials relative to the density of nonporous resins from which the materials are fashioned. Preferably, porosity of the porous materials to be treated in accordance with this invention will vary in the range of 30% to 85%. The pores which account for the porosity of the porous materials may be open and interconnected or may be closed. For filtrative applications, such pores are preferably open and interconnected. For dialytic and oxygenative applications, such pores need not necessarily be open and interconnected. The porous materials may be in the form of sheets, film, fibers, tubes, hollow fibers, porous coatings, or otherwise shaped articles.

Commonly, the matrix polymers of porous materials useful in this invention are chosen from the field of engineering resins, including aliphatic polyamides (nylons), aromatic polyamides ("aramids"), polysulfones, polycarbonates, polypropylenes, polyimides, polyetherimides, polyphenyleneoxides, polyesters, polyacrylonitriles, copolymers and terpolymers based on one or more of these polymers, and polymeric blends containing one or more of these polymers. These source polymers are routinely available in the form of pelletized engineering resins, and many of these polymers are particularly noted for their rigidity and strength. However, processing of these polymers into porous materials, such as ultrafiltration and microfiltration membranes, commonly results in porous articles whose surfaces are soft and easily marred by almost any kind of rubbing or abrasive contact. This softness appears to account for at least a portion of hysteresis effects commonly observed in porous membrane materials in pressurized filtrative and concentrative applications and heretofore generally attributed solely to biofouling. These porous materials are often highly compressible, as well, depending on degree of porosity. In addition to this softness, these materials may at times exhibit a tendency to absorb organic components from biological solutions directly into their polymeric matrices, further exacerbating the problem of softness and pressure hysteresis.

In accordance with this invention herein described, these porous materials are plasma-annealed in a gas plasma treatment apparatus generally by placing the materials in such an apparatus, evacuating the apparatus to a suitable state of vacuum, admitting a preferred gas or mixture of gases, and initiating a glow discharge plasma through the gas or mixture of gases in a region defined be glow discharge electrodes. The glow discharge may be either generated in instant contact with the porous materials or alternatively in conjunction with subsequent passage of the porous materials through the glow discharge region.

The gas mixture is to contain an acetylene or a saturated hydrocarbon, preferably a saturated alkane, optionally with one or more additional gases such as a hydrophilic unsaturated organic monomer and/or oxygen or a source of oxygen (such as air). Other gases may be present, including generally inert gases such as argon or nitrogen. By inertness herein is meant that such gases have very low tendency, or essentially no tendency, to be chemically incorporated into either the chemical structure of the porous material surfaces or into the chemical structure of any plasma polymerizate deposited onto the porous material surfaces. When it is desired to have oxygen present in the glow discharge gases, pure oxygen may be added into the vacuum apparatus, or admitted as air, or may optionally be provided in the form of an oxygen precursor instead of oxygen, insofar as such precursor (hydrogen peroxide, water, ozone, etc.) generates within the glow discharge region a significant population of the same species as would be generated by a glow discharge through a mixture containing gaseous oxygen. Air is a particularly preferred source of oxygen for the plasma annealing process, due to its easy availability and essentially zero cost. Air is generally defined herein to include about 78% nitrogen gas and about 21% oxygen gas.

The saturated hydrocarbon is preferably a low molecular weight alkane chosen from the group represented by methane, ethane, and propane, all of which are permanent gases at normal ambient atmospheric conditions. Particularly preferred is methane as the alkane. Methane is rather difficultly polymerized by gas plasma techniques, and a methane plasma reluctantly deposits a polymerizate at a notably slow deposition rate. Two advantages are derived thereby. First, greater exposure time may be used for plasma annealing of a porous material in a methane-based plasma, since deposition of the plasma polymerizate deposit is slow and controlled. Second, surface pores are not likely to be filled or blocked by a thick coating of plasma polymerizate, in that the deposition rate is so slow. In fact, with a methane-based gas plasma, surface pores are often slightly increased in size rather than decreased. A plasma polymerizate of methane will contain residual reactive sites, typically radical or radical-ion sites. These sites will react with air and/or contaminants subsequent to the plasma annealing process. Such sites are preferably eliminated in the current invention by simultaneous exposure to oxygen within the glow discharge zone. Oxygen reacts with these radical sites immediately upon their formation, resulting in two immediate benefits: greatly reduced residual activity, and controlled improvement of hydrophilicity.

The hydrocarbon gas may be used within the glow discharge apparatus at system pressures in the range from about 20 to about 1000 mtorr, preferably in the range from about 30 to about 200 mtorr. Oxygen gas may be used within the same apparatus at pressures in generally the same range as the hydrocarbon gas, generally when the hydrocarbon gas is a saturated alkane such as methane. The hydrophilic unsaturated monomer, preferably acrylic acid, may also be used within the same apparatus at pressures in generally the same range as the hydrocarbon gas. Blends of the hydrocarbon with the unsaturated organic monomer may also be used under similar conditions, a preferred example of such a blend being a mixture of methane and acrylic acid, The overall system pressure in the apparatus during the plasma annealing process may vary in the range of from about 50 mtorr to about 2000 mtorr. To maintain desired pressure levels, especially since monomer is being consumed in the plasma polymerization operation, continuous inflow of monomer vapor to the plasma zone is normally practiced. When nonpolymerizable gases are blended with the monomer vapor, continuous removal of excess gases is accomplished by a simultaneous pumping through the vacuum port to a vacuum source. Since some nonpolymerizable gases are often evolved from glow discharge gas plasmas, it is advantageous to control gas plasma pressure at least in part through simultaneous vacuum pumping during plasma polymerizate deposition on a substrate during the plasma annealing process of this invention.

The deposition rate for a plasma polymerizate onto the porous materials from these gas blends may vary from a low of generally about one angstrom thickness per minute of exposure time to a high of generally about 100 angstroms thickness per minute of exposure time. High deposition rates are not necessarily advantageous to the plasma-annealing process, in that undesirably thick coatings may be deposited during the time necessary to achieve the annealing effect. Deposition rates can be altered by control of monomer pressure and by intensity of the glow discharge. The latter may be readily accomplished by one skilled in the art through design of the apparatus reaction chamber, placement of the electrodes, and power applied through the electrodes. In plasma annealing, it is preferred to operate at low discharge power, in the range of from about 75 watts to about 150 watts discharge power. A nominally 100 watt discharge power has been used with great success in plasma annealing of porous substrates. The time of exposure needed to achieve plasma annealing of the soft polymer surface in porous materials is in the range of about one second to about two minutes, preferably from about one second to about 20 seconds.

The glow discharge through the gas or blend of gases in the vacuum chamber may be initiated by means of an audiofrequency, a microwave frequency or a radiofrequency field transmitted to or through a zone in the vacuum chamber. Particularly preferred is the use of a radiofrequency (RF) discharge, transmitted through a spatial zone in the vacuum chamber by an electrode connected to an RF signal generator. A more localized and intensified gas plasma is attained by means of an electrode pair (one of which is a "ground"), whereas a more diffuse gas plasma is a result of a single electrode. Electrodes are preferably located exteriorly to the vacuum chamber, but may be positioned within the vacuum chamber. A rather broad range of RF signal frequencies starting as low as 50 kHz may be used in causing and maintaining a glow discharge through the monomer vapor. The 50 kHz frequency was used with good effect in the experimental examples given at the end of this disclosure. In commercial scale usage of RF plasma polymerization, an assigned radiofrequency of 13.56 MHz may be more preferable to use to avoid potential radio interference problems.

The exposed surfaces of the porous articles contains pores therein having an initial average pore size, and these pores have an equal or greater average pore size after plasma annealing.

The following examples are given to illustrate the plasma annealing process as it is preferably carried out, including representative gas blends, operating conditions, and deposition rates for plasma polymerizates onto the surfaces being simultaneously annealed. Further examples are given to illustrate the hardening (i.e., annealing) effects of the process and the reduced adsorptive characteristics of the processed materials toward proteinaceous substances.

EXAMPLE 1

Deposition rates of plasma polymerizates onto surfaces were determined for methane and acrylic acid under plasma annealing conditions of 100 watts discharge power and varying monomer flow rates and system pressures as shown in Table 1. Deposition rates in the typical plasma processing conditions of this invention were about 0.6 to about 1.4 angstroms per second in the case of methane and about 24 to about 34 angstroms per second in the case of acrylic acid. In that very little plasma polymer deposition (i.e., about 20 angstroms) is preferred in the plasma annealing process, these deposition rates provided guidance for optimum exposure time of porous materials to gas plasmas utilizing methane or alternatively acrylic acid.

TABLE 1

| Methane flow rate (SCCM) | 10 | 20 | 50 |
|---|---|---|---|
| System Pressure (mtorr) | Deposition Rate (Å/sec) | | |
| 30 | 1.4 | 1.2 | — |
| 50 | 1.4 | 1.1 | 0.6 |
| 100 | 1.4 | 1.0 | 0.6 |
| 200 | — | — | 0.6 |
| Acrylic Acid flow rate (SCCM) | 19 | 26 | 35 |
| System Pressure (mtorr) | Deposition Rate (Å/sec) | | |
| 100 | 24.3 | 33.8 | 32.8 |

EXAMPLES 2–4

Polysulfone sheet membrane was obtained from Millipore Corporation (U.S.A.) having a product name designation of Minitan-S, and characterized as having a nominal molecular weight cut-off of 10,000 daltons. Portions of this sheet membrane were treated by plasma annealing with plasma polymerizate deposition under three sets of conditions as set forth in Table 2, at a discharge power of 100 watts. Blends of methane/air and methane/acetic acid were used in the plasma annealing process. Coating thicknesses were estimated from plasma exposure time at the process conditions, and resulting products were characterized for weak ion exchange capacity and water contact angle. A change in the hydrophilicity of the treated surfaces was noted by decreased water contact angles –30 to 50 degrees— compared with untreated membrane which showed a water contact angle of 60 degrees under identical measurement conditions.

TABLE 2

| Millipore Minitan-S Gas Blend | Example 2 Methane/air | Example 3 Methane/air | Example 4 Methane/acrylic acid |
|---|---|---|---|
| Flow Rate (SCCM) | 7.5 / 2.5 | 10 / 40 | 40 / 11.8 |
| System Pressure (mtorr) | 75 | 400 | 400 |
| Residence Time (sec) | 4.1 | 4.1 | 4.1 |
| Estimated Coating Thickness (Å) | 4.1 | 1.1 | 23 |
| Weak Ion Exchange Capacity COOH (1/nm$^2$) | 46 | 22 | 137 |
| Water Contact Angle (degree) | 50 | 45 | 30 |

EXAMPLES 5–9

Polysulfone sheet membrane was obtained from Osmonics Corporation (U.S.A.) consisting of an industrial ultrafiltration membrane characterized as having a nominal molecular weight cut-off of 10,000 daltons. Portions of this sheet membrane were treated by plasma annealing with plasma polymerizate deposition under three sets of conditions as set forth in Table 3, at a discharge power of 100 watts. Blends of methane/air and methane/acetic acid were used in the plasma annealing process. Coating thicknesses were estimated from plasma exposure time at the process conditions, and resulting products were characterized for weak ion exchange capacity and water contact angle. A change in the hydrophilicity of the treated surfaces was noted by decreased water contact angles –40 to 50 degrees— compared with untreated membrane which showed a water contact angle of 60 degrees under identical measurement conditions.

TABLE 3

| Osmonics UF Membrane Gas Blend | Example 5 | Example 6 | Example 7 | Example 8 | Example 9 |
|---|---|---|---|---|---|
| | Methane / Air | | | Methane / Acrylic Acid | |
| Flow Rate (SCCM) | 7.5 / 2.5 | 7.5 / 2.5 | 10 / 40 | 40 / 13.7 | 40 / 14.4 |
| System Pressure (mtorr) | 75 | 75 | 400 | 400 | 400 |
| Residence Time (sec) | 2.6 | 10.5 | 10.5 | 0.9 | 0.4 |
| Estimated Coating Thickness (Å) | 2.6 | 5.3 | 2.8 | 5.3 | 2.8 |
| Weak Ion Exchange Capacity COOH (1/nm$^2$) | 13 | — | — | 140 | — |
| Water Contact Angle (degree) | 40 | — | — | 50 | — |

EXAMPLE 10

A hollow fiber composed principally of polysulfone was obtained from Fresenius AG (Germany). It had a product name designation of PSP 600, and was characterized as having a nominal molecular weight cut-off of 30,000 daltons. This fiber was treated in a gas plasma apparatus by exposing the outer surface of the hollow fiber to a glow discharge generated in methane gas. The fiber was passed from a source spool to take-up through the gas plasma for a total plasma annealing exposure time of 18 seconds. The plasma-treated fiber was assembled into a hollow fiber module by conventional methods, and contained 75 fibers of 15 cm length. The fiber in the module was tested for the effect of hydraulic pressure on water permeation rate. The effect of plasma annealing was shown by means of the following type of test. A flow rate of water was established through the bores (internal channels) of the hollow fibers, and fluid pressure was applied to the fiber exteriors by means of a peristaltic pump. For comparison, untreated (non-annealed) fibers were incorporated into the same type of module and tested under essentially identical conditions. Results of this test are shown graphically in FIG. 1 Plasma-annealed fibers were found to retained generally ideal flow through the bores throughout the pressure range employed in the test, as exemplified by the essentially straight line 10, whereas untreated fibers showed a pronounced lower flow and pronounced curvature of the line 11 as a function of applied pressure.

Figure 2:
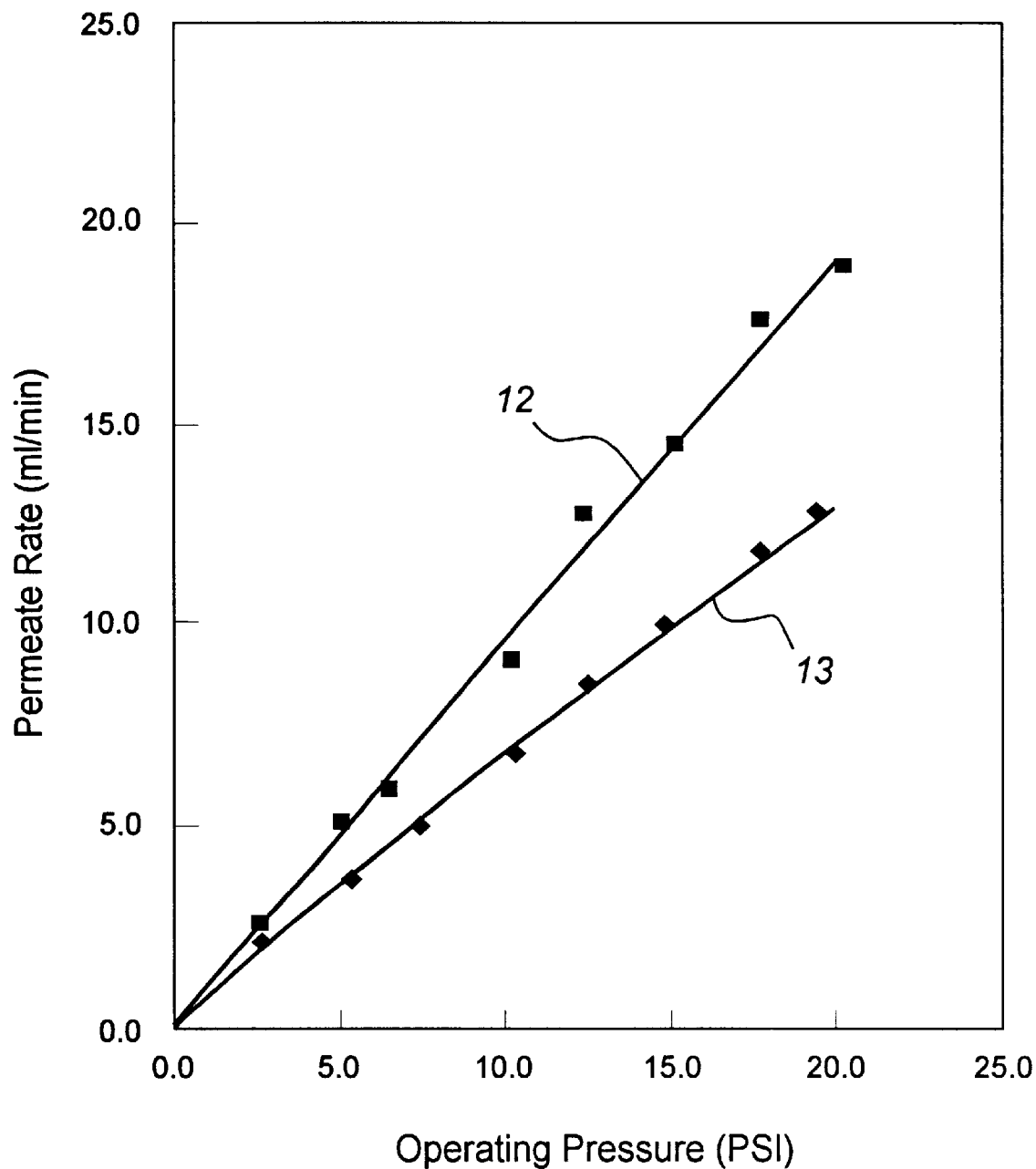
FIG. 2 is a graph of permeate flow through polysulfone hollow fibers as a function of internally applied filtration pressure.

In an alternate type of test, flow was established through the fibers by permeation from the fiber interior through the walls of the fiber to the exterior, results of which are graphically displayed in FIG. 2. The plasma-annealed fibers were found to retain generally ideal flow throughout the pressure range employed in the test, as exemplified by the essentially straight line 12, whereas untreated fiber showed a moderately lower flux and a significant curvature of the line '13 as a function of applied pressure.

EXAMPLES 11–13

Polysulfone hollow fibers described in Example 10 were treated with glow discharge gas plasmas at a discharge power of 50 watts under the conditions in Table 4, using methane as an annealing gas and air (oxygen) or acrylic acid as hydrophilic plasma gases. These examples were evaluated for protein adsorption characteristics by exposing them to a streptavidin assay procedure commonly used in genomic analyses. Streptavidin-AP in tris-buffered saline solution, 0.53 nmol/liter, was applied to the modified fibers and to an untreated control to determine the degree of protein adsorption. The presence and amount of streptavidin-AP adsorbed onto the fibers was measured by chemiluminescence development techniques, counting relative light units via a luminometer. were counted for seconds. Untreated control fiber was measured for streptavidin-AP adsorption by the same technique. Chemiluminescence readings were taken as a measure of adsorbed streptavidin-AP, and readings were compared. Examples 11 and 12 showed only 36% and 23% as much streptavidin adsorption as the untreated control fiber based on luminometer readings, and thus manifest at least a 64% reduction in adsorption of this protein.

TABLE 4

| PSP 600 Hollow Fiber Membrane Gas Blend | Example 11 Methane/ Air | Example 12 Methane/ Acrylic Acid | Example 13 Methane/ Air | Control na |
|---|---|---|---|---|
| Flow Rate (SCCM) | 7.5 / 2.5 | 40 / 13.7 | 7.5 / 2.5 | na |
| System Pressure (mtorr) | 75 | 400 | 75 | na |
| Residence Time (sec) | 4.2 | 4.2 | 8.4 | na |
| Est. Coating Thickness (Å) | 2.1 | 25.6 | 4.2 | 0 |
| Weak Ion Exchange Capac. COOH (1/nm$^2$) | 27 | 555 | 47 | 0 |
| Protein Adsorption (Streptavidin) | | | | |
| RLU | 14,853 | 9,592 | 2,656 | 41,102 |
| % | 36 | 23 | 6 | 100 |

Example 13 showed only 6% of the level of the protein adsorption observed for untreated fiber in the streptavidin challenge, a remarkable 94% decrease in protein adsorption.

The examples provided above illustrate how the invention involving plasma annealing with concomitant modification of surface hydrophilicity and reduction of protein adsorption results in useful materials with discernible differences from other materials in the art. These examples are not to be taken as limiting the nature or scope of the invention. Rather, the nature and scope of the invention is to be determined by the claims which are hereinafter joined to this description of the invention.

I claim:

1. A method of treating a porous article comprising a process of plasma-annealing at least one exposed surface of the porous article by exposure to a glow discharge gas plasma formed in a gas consisting of a saturated hydrocarbon or an acetylene, wherein the exposed surface is simultaneously hardened by interaction with the gas plasma and altered by a deposit of a plasma polymerizate.

2. The method according to claim 1 wherein the porous article contains pores having predefined sizes in said exposed surface before exposure to said gas plasma, said pores having equal or larger sizes after the process of plasma annealing.

3. The method according to claim 2 wherein the gas comprises a mixture containing at least one member chosen from the group consisting of oxygen, air, and a hydrophilic unsaturated organic monomer.

4. The method according to claim 3 wherein the saturated hydrocarbon consists of an alkane chosen from the group consisting of methane, ethane and propane.

5. The method according to claim 2 wherein the saturated hydrocarbon is methane.

6. A method of treating a porous article comprising a process of plasma-annealing at least one exposed surface of the porous article by exposure to a glow discharge gas plasma formed in a gas mixture consisting of a saturated hydrocarbon or an acetylene in a blend with oxygen, air or a hydrophilic unsaturated organic monomer, wherein the exposed surface is simultaneously coated with a deposit of a plasma polymerizate and hardened by interaction with the gas plasma.

7. The method according to claim 6 wherein the saturated alkane is chosen from the group consisting of methane, ethane, and propane.

8. The method according to claim 6 wherein the gas mixture comprises a blend of methane with air or oxygen.

9. The method according to claim 8 wherein the exposed surface of the porous article contains pores therein having an initial average pore size, said pores having equal or greater average pore size after plasma annealing.

10. A porous article comprising a porous polymeric material having at least one surface plasma-annealed by exposure to a glow discharge gas plasma, wherein said surface is treated with a gas plasma formed in a gas mixture consisting of a saturated hydrocarbon or an acetylene in a blend with oxygen or air, wherein said surface is simultaneously coated with a deposit of a plasma polymerizate and hardened by interaction with the gas plasma.

11. A porous article comprising a porous polymeric material having at least one surface plasma-annealed by exposure of said surface to a gas plasma formed by glow discharge through a gas comprising a saturated hydrocarbon or an acetylene, wherein the exposed surface is simultaneously hardened by interaction with the gas plasma and altered by a deposit of a plasma polymerizate.

12. The article according to claim 11 wherein the exposed surface of the porous article contains pores therein having an initial average pore size, said pores having equal or greater average pore size after plasma annealing.

13. The method according to claim 12 wherein the saturated hydrocarbon is a member chosen from the group consisting of methane, ethane and propane.

14. The method according to claim 12 wherein the saturated hydrocarbon is methane.

15. A porous article comprising a porous polymeric material having at least one surface plasma-annealed by exposure to a glow discharge gas plasma, wherein said surface is treated with a gas plasma formed in a gas mixture consisting of a saturated hydrocarbon or an acetylene in a blend with an unsaturated hydrophilic monomer, wherein said surface is simultaneously coated with a deposit of a plasma polymerizate and hardened by interaction with the gas plasma.

16. An article comprising a porous polymeric membrane having at least one surface plasma-annealed by exposure of said surface to a gas plasma formed by glow discharge through a gas comprising a saturated hydrocarbon or an acetylene, wherein the exposed surface is simultaneously hardened by interaction with the gas plasma and altered by a deposit of a plasma polymerizate.

17. The method according to claim 15 wherein said surface of the porous article has increased hydrophilicity as a result of the process of plasma annealing.

18. The method according to claim 15 wherein said monomer is acrylic acid.

* * * * *